(12) United States Patent
Rankin, II et al.

(10) Patent No.: US 7,536,918 B2
(45) Date of Patent: May 26, 2009

(54) METHOD AND APPARATUS TO MEASURE FORCE-TRAVEL PROFILE OF A SHIFTER IN A VEHICLE ENVIRONMENT

(75) Inventors: James Rankin, II, Novi, MI (US); Pietro Buttolo, Dearborn Heights, MI (US); Yifan Chen, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 234 days.

(21) Appl. No.: 11/511,562

(22) Filed: Aug. 29, 2006

(65) Prior Publication Data
US 2008/0059109 A1   Mar. 6, 2008

(51) Int. Cl.
*G01B 7/16* (2006.01)
(52) U.S. Cl. ...................................................... 73/763
(58) Field of Classification Search ............ 73/760–860
See application file for complete search history.

(56) References Cited
U.S. PATENT DOCUMENTS
5,852,953 A * 12/1998 Ersoy ...................... 74/473.12
7,056,263 B2 * 6/2006 Whitton ...................... 477/143
7,069,807 B2 * 7/2006 Girlando et al. .......... 74/473.18
7,137,313 B2 * 11/2006 Giefer et al. ............. 74/473.12

* cited by examiner

*Primary Examiner*—Max Noori
(74) *Attorney, Agent, or Firm*—David Kelley, Esq.; Tung & Associates

(57) ABSTRACT

Generally provided is a system and method that determines a force-travel profile of a shifter in a vehicle having a shifter having an associated shifter shaft for a transmission. The feel of the shifter to a user of the shifter may be improved by using present system. Additionally, accurate measurements for determining shifter forces applied to a shifter and corresponding position of the shifter are performed. In operation, the system correlates the forces applied to the shifter and associated movement of the shifter to determine an associated feel of the shifter. The system operates to equate the forces correlating to the shifter and movement of the shifter to calibrate a feel of the shifter for a user applying the force to the shifter to actuate the shifter.

21 Claims, 11 Drawing Sheets

BEFORE CALIBRATION

AFTER CALIBRATION

FIG. 16
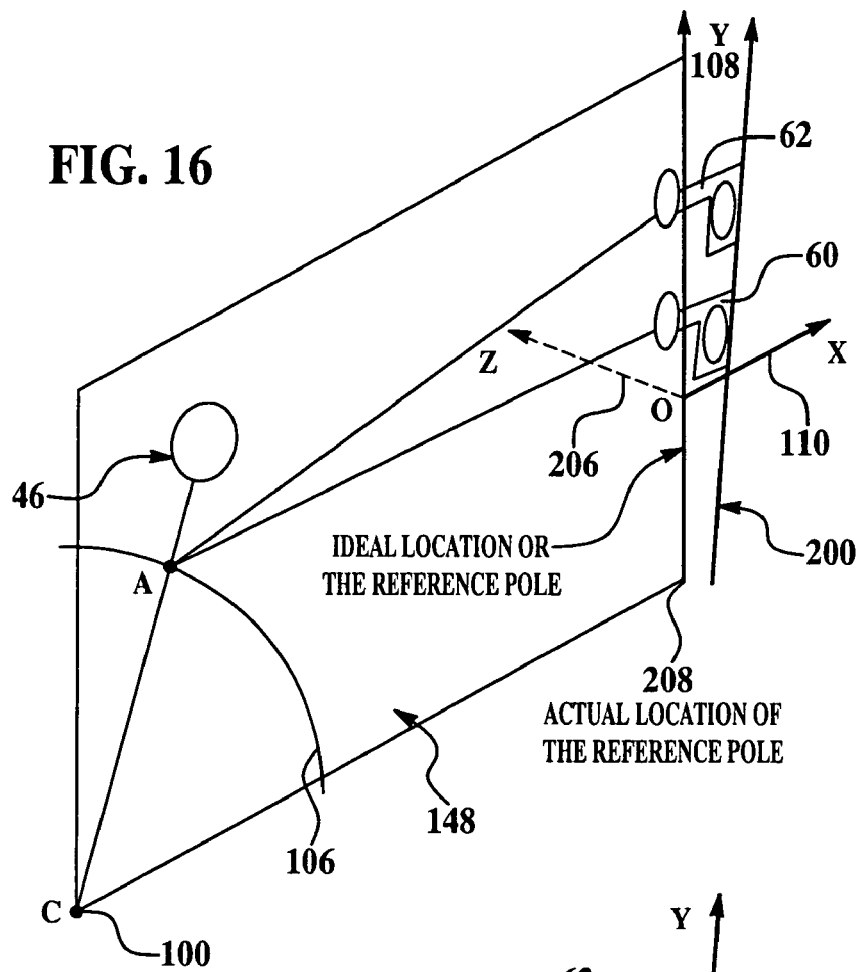
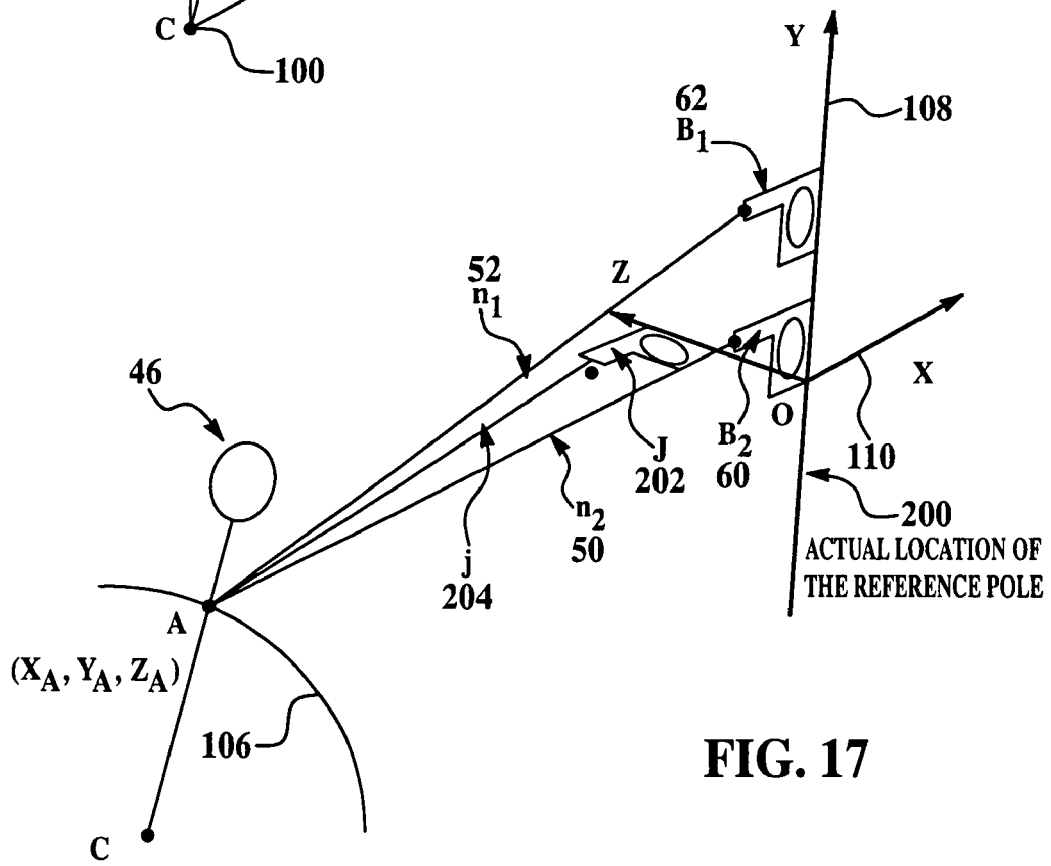
FIG. 17

METHOD AND APPARATUS TO MEASURE FORCE-TRAVEL PROFILE OF A SHIFTER IN A VEHICLE ENVIRONMENT

FIELD OF THE INVENTION

The present invention generally relates to a data acquisition and processing system for processing shifter data associated with a shifter in a vehicle and more particularly, relates to a system and method used to measure force-travel profile of a shifter in a vehicle environment.

BACKGROUND

Shifting of gears in a transmission in a vehicle environment is accomplished by use of a shifter in an automobile. The shifter provides an interactive user interface between a driver of the vehicle and the transmission. Thus, shifting a transmission using a shifter in a vehicle environment is an integral part of a driver's driving experience.

The force necessary to move the shifter from one position to another varies in accordance with each type of vehicle being driven. The varying force necessary for a user to apply to the shifter to move the shifter from one position to another may be equated to the quality or "feel" of the shifter felt by a user of the shifter.

The quality of shifter-feel is important to drivers of the vehicle. A driver associates a feel of the shifter with a particular type of vehicle being driven. For example, the preferred feel of a shifter associated with a sports car is not the same as a shifter feel of a luxury vehicle. Thus, a driver of a sports car may expect to feel more resistance from the shifter and thus, need to apply more force or torque to the shifter to move the shifter than the same driver would driving a luxury vehicle.

In order to improve the quality of the feel of the shifter, a system is needed that provides accurate measurements of force-travel data of a variety of shifters in various vehicle environments. The accurate measurements of force-travel data can be used to improve shifter quality and to engineer improved shifters, thereby improving the feel of the shifter to drivers using the shifter in a vehicle environment.

SUMMARY

Generally provided is a system and method that determines a force-travel profile of a shifter in a vehicle having an instrument panel counsel, a windshield, and a shifter having an associated shifter shaft for a transmission. The feel of the shifter to a user of the shifter may be improved by using the system and method in accordance with an embodiment of the invention.

More particularly, the system includes: a shifter fixture mounted to the shifter; a hand actuation interface that operates to actuate the shifter when force is applied to the hand actuation interface by a user; a multi-dimensional force sensor (force sensor) that operates to sense forces sustained on the shifter fixture mounted to the shifter; a rigid linkage that interconnects the shifter fixture with the force sensor; a universal joint linking the force sensor to the hand actuation interface; a travel measurement rod; at least two transducers, a first transducer and a second transducer each mechanically mounted onto the travel measurement rod to determine position of a reference point associated with the travel measurement rod; and a data acquisition device in operable electrical communication with the multi-dimensional force sensor and the at least two transponders, wherein the data acquisition device operates to process force inputs received from the multi-dimensional force sensor and reference point position inputs from the at least two transponders to generate a force-travel curve of the shifter.

Additionally, a method of using the system associates forces applied to a shifter with movement or travel of the shifter. More particularly, the method provides the steps of associating forces applied to a shifter with movement of the shifter; and correlating the forces applied to the shifter and associated movement of the shifter with a feel of the shifter when the shifter is actuated by a user.

BRIEF DESCRIPTION OF THE DRAWINGS

These and other objects, features and advantages of the present invention will become apparent from the following detailed description and the appended drawings in which:

FIG. 16 illustrates a three-dimensional system used to determine a three-dimensional curve associated with a measured reference point in accordance with an embodiment of the invention.

FIG. 17 illustrates a three-dimensional system used to determine a three-dimensional curve associated with a measured reference point in accordance with an embodiment of the invention.

DETAILED DESCRIPTION

Generally provided is a system and method that determines a force-travel profile of a shifter in a vehicle having an instrument panel counsel, a windshield, and a shifter having an associated shifter shaft for a transmission. The feel of the shifter to a user of the shifter may be improved by using the system and method in accordance with an embodiment of the invention. In operation, the system correlates the forces applied to the shifter and associated movement of the shifter to determine an associated feel of the shifter. The system operates to equate the forces correlating to the shifter and movement of the shifter to calibrate a feel of the shifter for a user applying the force to the shifter to actuate the shifter.

Figure 1:
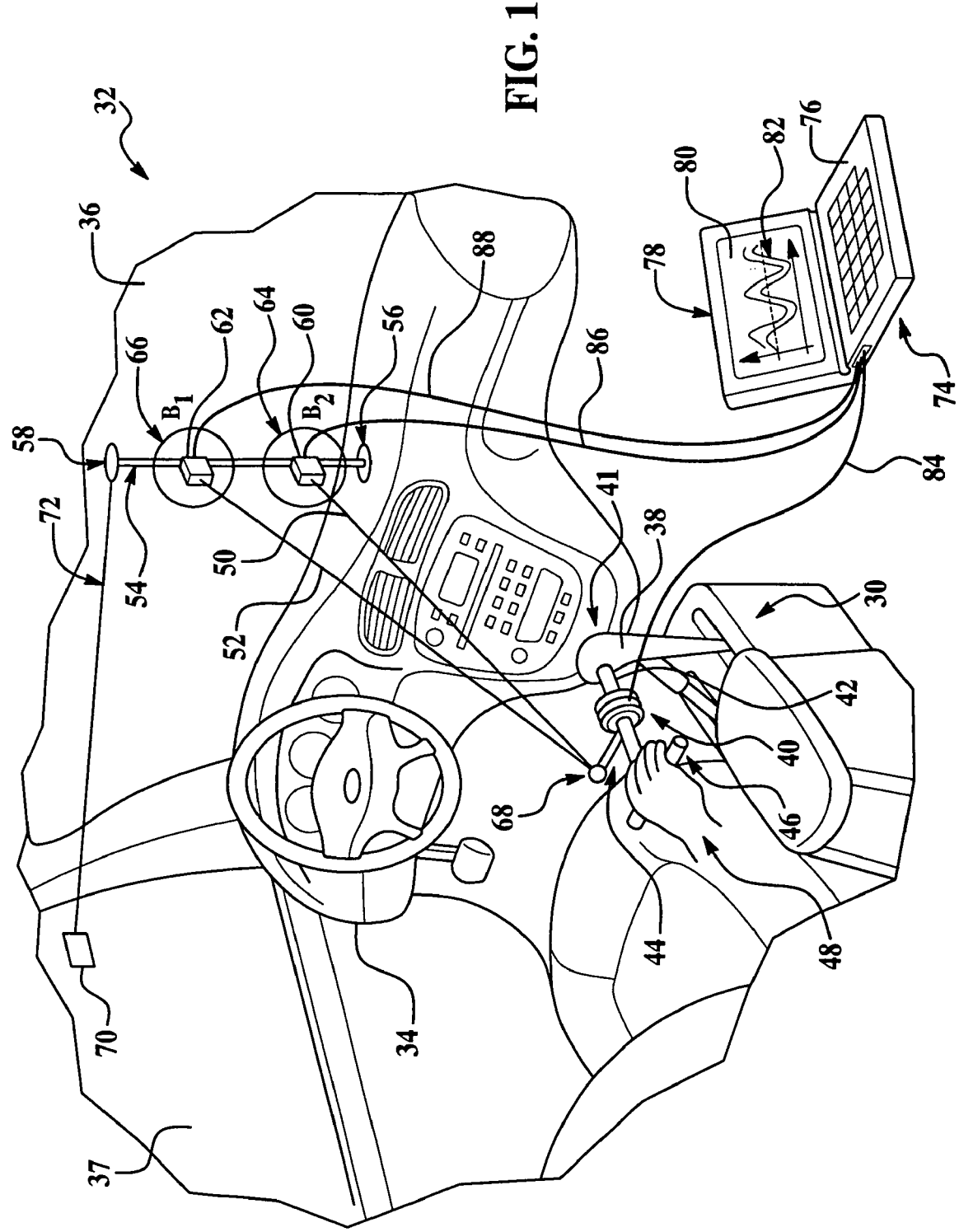
FIG. 1 illustrates a perspective view of a system located in a vehicle environment that measures force-travel profile of a shifter for a transmission in accordance with an embodiment of the invention.
Figure 2:
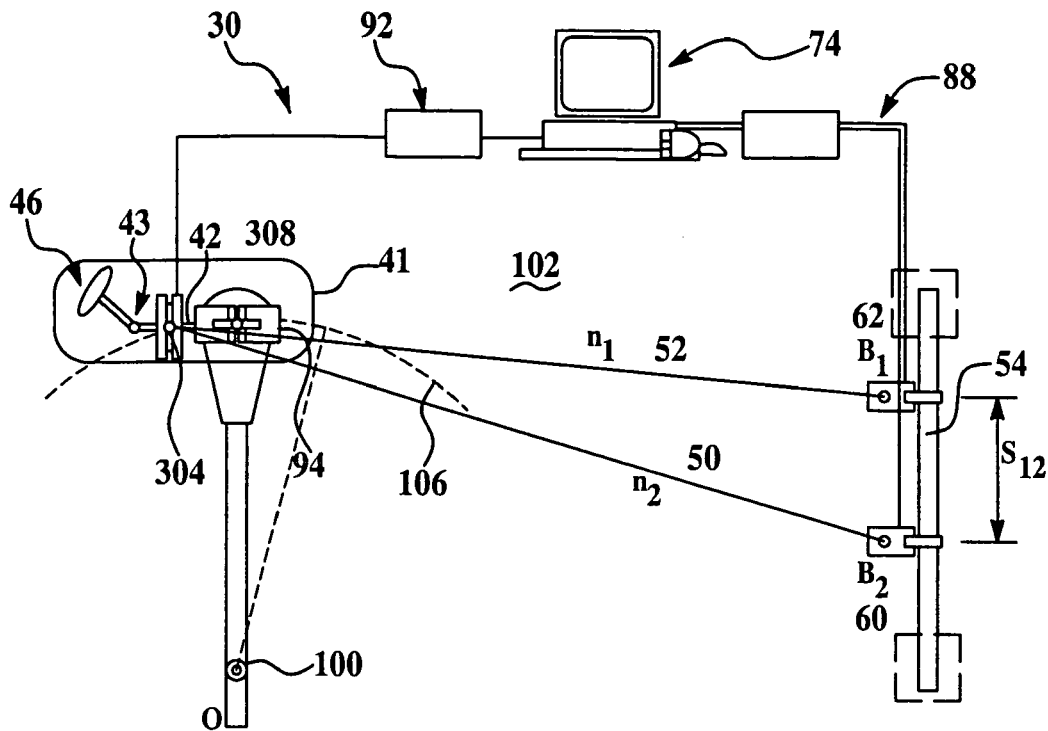
FIG. 2 illustrates a system flow diagram of the system shown in FIG. 1.

A system 30 is shown in FIGS. 1-2, which determine a force-travel profile of a shifter in a vehicle.

FIG. 1 illustrates a perspective view of the system 30 within a vehicle 32. FIG. 2 illustrates a system flow diagram of the system 30. Referring now to FIGS. 1-2, the system 30 is mounted within the vehicle 32, wherein the vehicle 32 has an instrument panel counsel 34, a windshield 36, and a side window 37. Additionally, a shifter 38 is provided wherein the system 30 mounts to the shifter 38, the windshield 36, and the side window 37.

Figure 18:
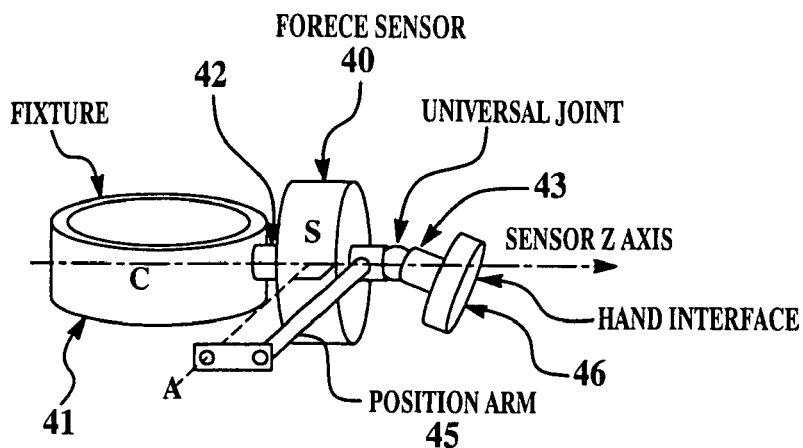
FIG. 18 illustrates hardware elements of an end-effector.

As shown in FIGS. 1-2 and 18, an end-effector 41 is provided having a multi-dimensional force sensor 40, a shifter fixture 94 that mounts the end-effector 41 rigidly to a shifter 38 to be measured, and a position arm 45. The multi-dimensional force sensor (force sensor) 40 is provided to collect forces sustained on a shifter fixture 94 mounted to the shifter 38. Preferably, the force sensor has six degrees of freedom (DoF) and may be either analog or digital. Signals measured using an analog sensor may be conditioned using a data conditioning unit.

A rigid linkage 42 interconnects the shifter fixture 94 with the force sensor 40 and further with a hand actuation interface 46 that operates to provide an easily graspable actuator for a person having a hand 48 to actuate the hand actuation interface 46.

Like elements are referred to herein with like reference numbers.

FIG. 2 illustrates an overview of a force-travel profile determination system 30 within a vehicle. In one embodiment of the invention shown in FIG. 18, the end-effector 41 has a hand actuation interface 46 in pivotal communication with the rigid linkage 42 about a universal joint 43.

In one embodiment of the invention shown in FIG. 1, the interface 46 connects to the end-effector 47 via the universal joint 43 located between the hand interface 46 and the force sensor 40 for eliminating torque transmitting from the hand interface 46 to the force sensor 40.

In one embodiment of the invention shown in FIG. 2, an end of the position arm 45 (FIG. 18) defines a measured reference point A 102 from where travel of the shifter is determined. Connected to point A 102 are cables $n_1$ 52 and $n_2$ 50 that are connected to respective position transducers B2 60, and B1 62.

The position arm 45 and the interface 46 are positioned on the same side of the force sensor 40 to prevent any cable force from being recorded by the force sensor. The position arm is mounted in the way that it is parallel to a horizontal plane. The position arm 45 generally forms a 90° angle with the linkage 42. The position transducers 60, 62 are used to measure position of the point A 102 along an arc 106. The arc 106 defines a trajectory of point A when the hand actuation interface 46 is actuated by a user.

In one embodiment of the invention, a connection point for a defined point where travel is measured from and defines where a position transducer cable is connected to the position arm 45. Point S 304 defines a center of the force sensor 40. In addition, the connecting point A 102 is located on a line perpendicular to sensor 40's Z axis and passing through the point S 304, which is the center of the force sensor 40. This line is also parallel to a horizontal plane. A point C 308 is the center of the section on the shift knob where the device is mounted onto. This is the location where a force is determined relative to that of a force measured at S 304.

Force-travel profile may be represented as a function of torque needed to shift vs. the angular displacement of the shifter shaft about its center of rotation. Assuming that a rigid body is provided the radius of the trajectory of point S, i.e., $r_s$, the force component in the tangent direction of the trajectory, i.e., $F^s_t$, and the angular position of the bar CS($\alpha$) as illustrated in FIG. 2 may be determined. The torque needed to shift the shifter equals the product of $F^s_t$ and $r_s$, as shown in Equation 1:

$$\tau = F^s_t r_s \tag{1}$$

Figure 26:
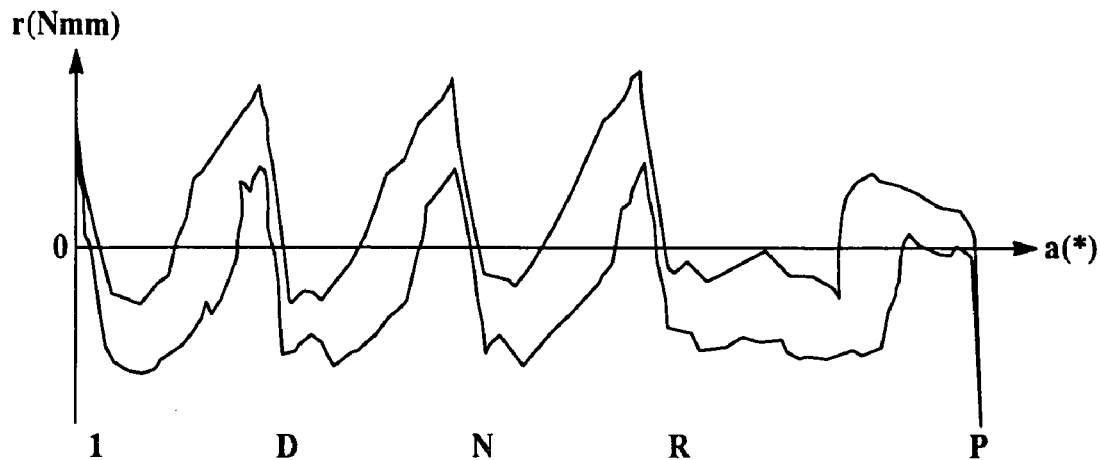
FIG. 26 illustrates an example of force-travel profile in the form of a torque vs. angle curve representing a round trip shifter movement from Parking to Parking position.

FIG. 26 illustrates an example of the output data representing a torque vs. angle profile representing a round trip from Park to Park. The separation of the two curves is due to friction is shown in FIG. 26.

Figure 19:
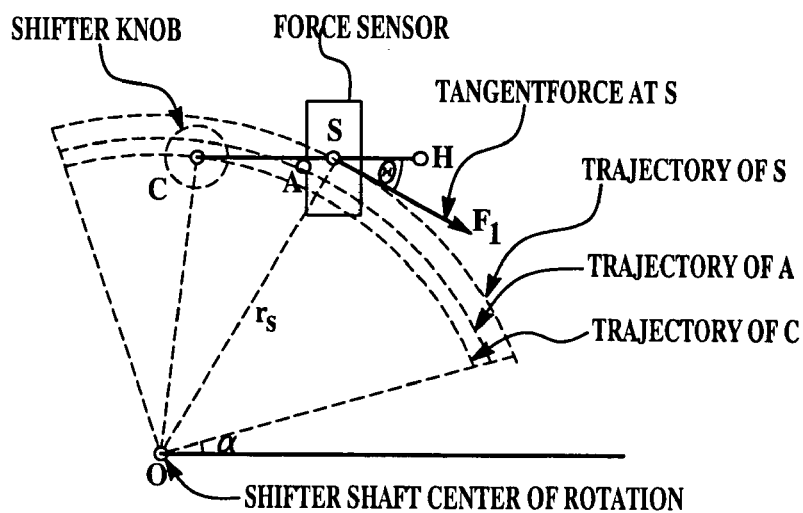
FIG. 19 illustrates trajectories of three different points on the shifter feel measurement device and their relationships as manifested by their maintaining a rigid body relationship during the motion of the shifter.

FIG. 19 illustrates parameters needed for a torque vs. angle curve. General mounting conditions cannot guarantee that A and S are coincidental as shown in the side view.

Referring now to FIG. 2, transducers B2 60 and B1 62 are "slide-ably" mounted on a transducer reference pole 54, wherein the transducers B2 60 and B1 62 are spaced apart a distance $S_{12}$ along the transducer reference pole 54. The multiple cable-driven position transducers B2 60 and B1 62 may be either analog or digital.

Additionally, if the shifter 38 pivots at one point C 100, its motion is confined to a plane, then at least two transducers must be provided. Without losing generality the plane is assumed perpendicular to a horizontal plane.

When a force is applied to the hand actuation interface 46, force sensor data are collected from the force sensor 40 and position data are collected from the position transducers B2

60, B1 62, respectively that are in communication with the reference rod 54 to track movement of the point A. A link 84 provides a communication link to a data acquisition device 74. Additionally, link 86 associated with transducer B2 60 and link 88 associated with transducer B1 62 are also in operable electrical communication with the data acquisition device 74. The data acquisition device 74 may be used to filter or condition signals from the transducers 60, 62.

Data acquisition device 74 further provides an input/output device 76 such as keyboard/mouse, and monitor 78 having a graphical user interface (GUI) 80 illustrating a measured force-travel graph 82 as shown in FIG. 1. The measured force-travel curve 82 represents processed shifter force data and shifter position data plotted as a force-travel curve on the force-travel graph 82 having the processed shifter force data representing forces applied to the shifter along a first vertical axis shown in FIG. 1, and processed shifter position data representing travel of the shifter along a second horizontal axis of the force-travel graph 82. A more detailed view of the force-travel curve is shown in FIG. 26.

Additionally provided is a sensor data conditioning unit 92 in electrical communication with the force sensor 40 and the data acquisition device 74 via communication link 84.

The transducer reference pole 54 may be mounted to the windshield 36 through use of vertical connection support 56, 58 respectively, wherein the vertical connection support 56 may actually be mounted to a surface within the vehicle such as the instrument panel 34 via rubber feet 57. The vertical connection 58 may further be stabilized through use of a lateral connection support 72 which provides a side window strap further mounted to a side window 47 by a side window strap mounting device 70. The transducer reference pole may also be mounted to the windshield 36 via suction cups 64, 66 respectively.

Figure 3:
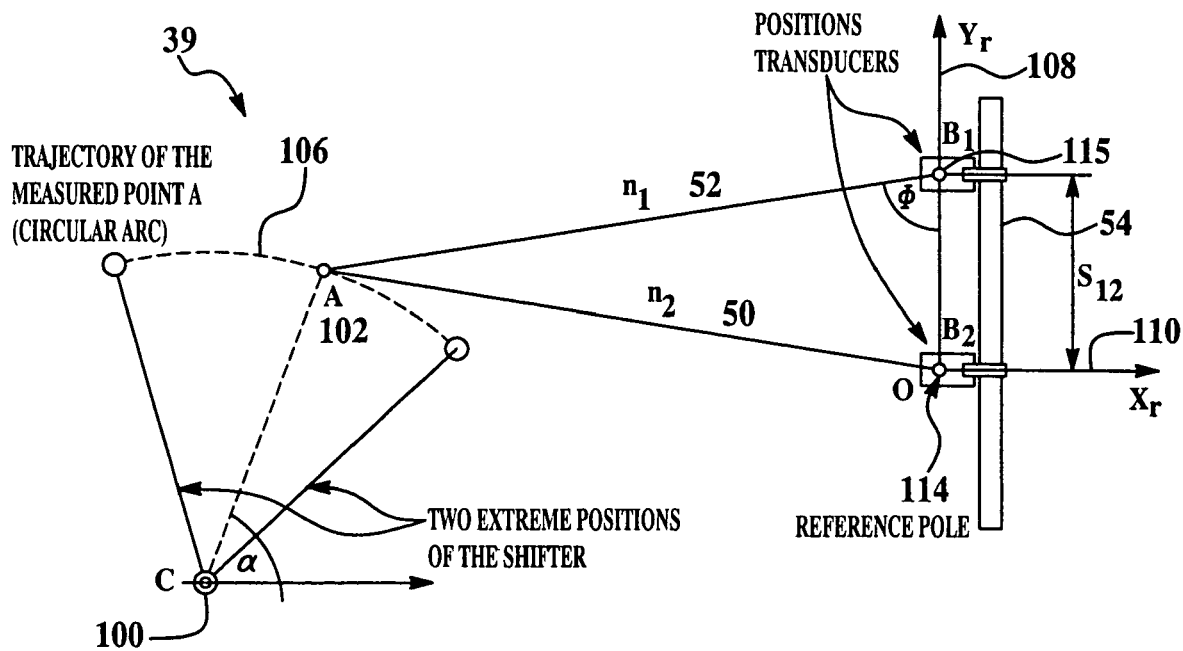
FIG. 3 illustrates a view of a shifter position measurement portion of the system shown in FIG. 1.

Additionally, as shown in FIG. 3, a reference point 114 defines the origin of a two dimensional reference frame with a Y axis 108 and an X axis 110. The Y axis 108 is defined by an axis Y extending from point 114 to a point 115 associated with the B1 62 transducer. An angle between the Y axis 108 and the cable n1 52 is labeled by Ø.

Optionally, as further shown in FIGS. 16-17, a third transducer J 202 associated with a cable j 204 may be provided to provide a three-dimensional reference system for determining reference point A 102 and its trajectory 106.

Figure 4:
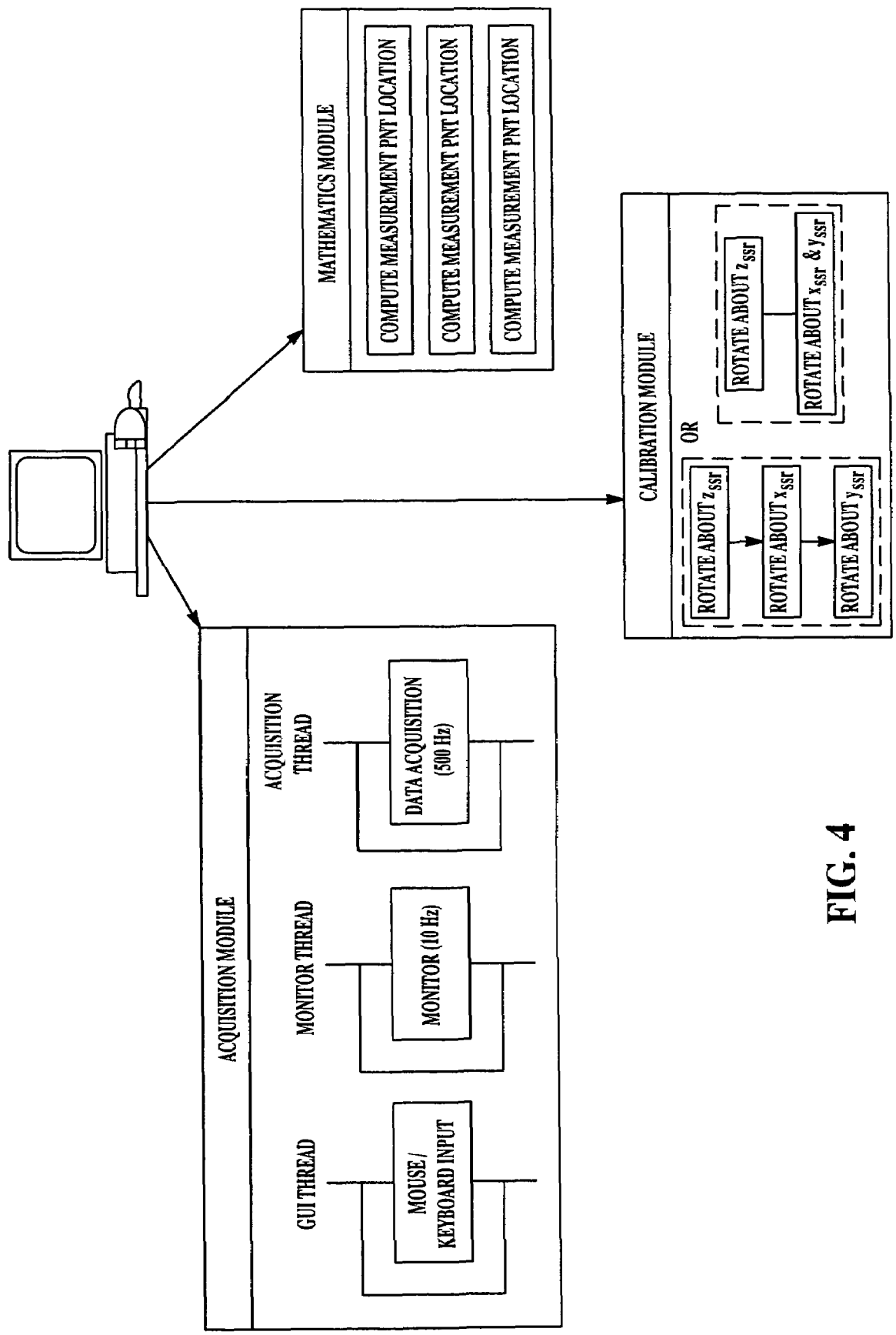
FIG. 4 illustrates a detailed view of a data acquisition device in accordance with an embodiment of the invention.

FIG. 4 illustrates a detailed view of the data acquisition device 74, wherein the data acquisition device 74 has a processor capable of processing force and position data associated with the shifter 38, which includes an acquisition module 116, a calibration module 118, and a mathematics module 120.

The acquisition module provides a GUI thread 80 associated with a mouse and keyboard (or touch screen) input 76; a monitor thread 102, wherein the monitor thread operates preferably at minimum 10 Hz; and an acquisition thread 124 wherein the acquisition thread operates to collect data at a frequency of 500 Hz.

The calibration module 118 aligns the force sensor to a projected trajectory of reference point A 102 associated with the shifter 38.

The software modules provided include an acquisition module, a mathematics module, and a calibration module. The acquisition module has a GUI thread having a mouse and keyboard (or touch screen) input, a monitor thread wherein the monitor is preferably minimum 10 Hz, and an acquisition thread having a frequency of data acquisition of 500 Hz. The mathematics module operates to perform the following functions: compute a measurement point location, estimate a shifter trajectory arc radius/center, and compensate for known system bias/errors.

The calibration module operates to align a force sensor frame with a shifter frame.

Figure 5:
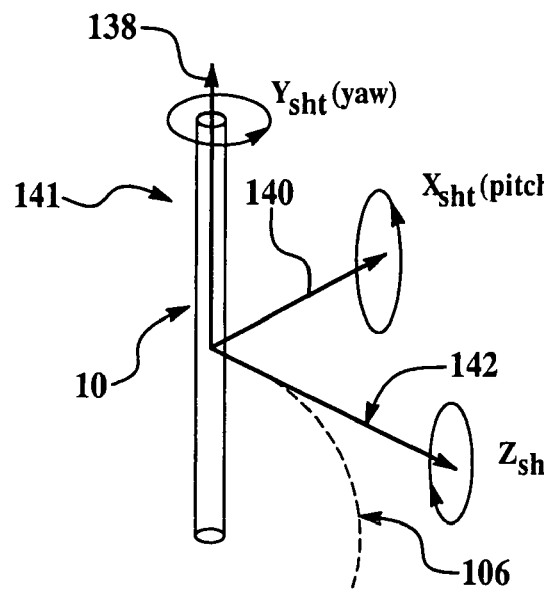
FIG. 5 illustrations the three axes of the shifter reference frame in accordance with an embodiment of the invention.

FIG. 5 illustrates the shifter frame 141 and movement of the shifter frame along a shifter trajectory 106 represented by the dashed line. More particularly, the shifter 38 has a shifter shaft 90 that is aligned with a Y axis portion of the three-dimensional shifter frame 141. In operation, the shifter frame 141 is aligned along a Z shifter axis 106, the $Z_{sht}$, along an X shifter axis 140, $X_{sht}$, and along a Y shifter axis 138, $Y_{sht}$. These alignments are achieved in the calibration step.

Figure 6:
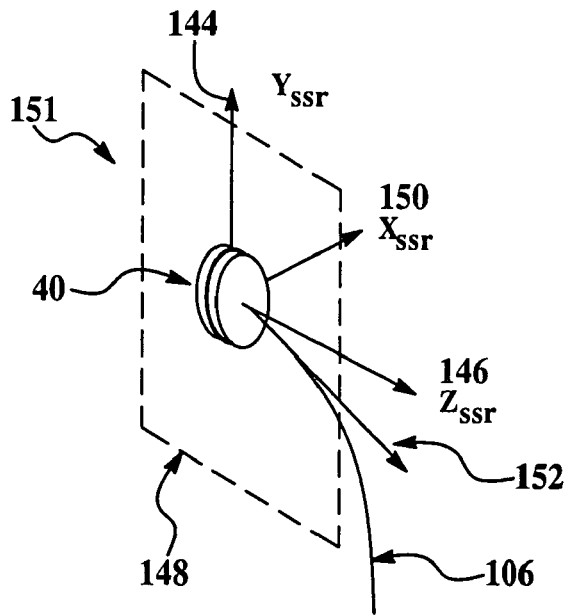
FIG. 6 illustrates a perspective view of a three-dimensional force sensor frame relative to a shifter reference frame.

FIG. 6 illustrates a perspective view of a three-dimensional force sensor frame 151 associated with the force sensor 40 before calibration. A plane defined by the intersection of the sensor Y axis and the sensor Z axis represents the plane alone which the shifter 38 travels. Additionally, vector 153 represents a tangent of the estimated shifter trajectory 155.

Initially, the force sensor 40 is not aligned with the shifter frame and thus needs calibration. The calibration of the force sensor reduces the impact of noise factors in measurement results, and further operates to reduce problems associated with nonconforming conditions such as, but not limited to misalignment of the force sensor with respect to the shifter, side forces exerted on the shifter by the operator, and varying free-form shifter knob shapes.

In one embodiment of the invention, FIGS. 7-11 illustrate calibration of the force sensor 40 using a three-step calibration process. In another embodiment of the invention, FIG. 12 illustrates calibration of the force sensor using a two step procedure.

Referring to FIGS. 6-11, the force sensor 40 spans a three-dimensional coordinate frame 151. The sensor frame 151 defines a Y axis, $Y_{ssr}$ 144 and Z axis, $Z_{ssr}$ 146 that intersect to define a plane P 148, and an X axis of the sensor, $X_{ssr}$ 150 substantially perpendicular to the plane P 148.

Figure 12:
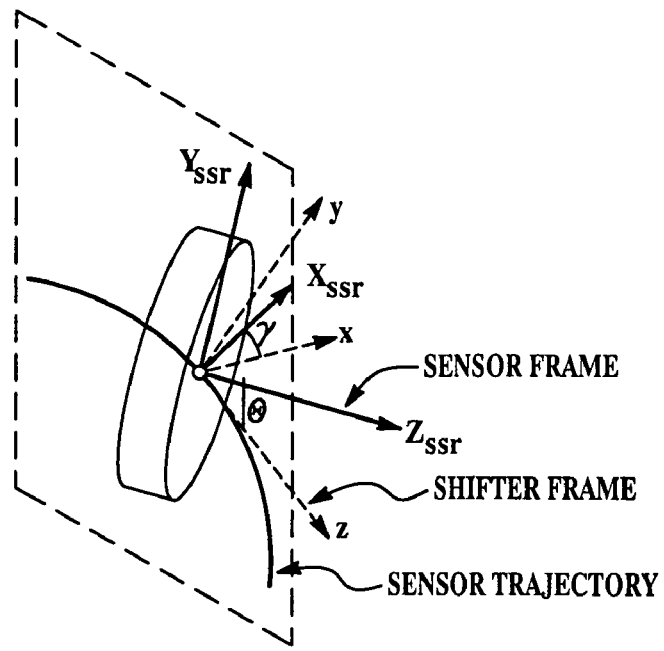
FIG. 12 illustrates a sensor frame that is calibrated using a three-step alignment procedure.

As shown in FIG. 12, two frames of reference that are centered at sensor position S. A first frame of reference is a shifter frame of reference: a geometric frame known as a Frenet frame, which travels along the trajectory of point S. A second frame of reference is defined as a native force sensor frame. Both the Frenet and the native force sensor frames are orthogonal frames. Because these two frames are most likely not aligned perfectly with each other, the purpose of calibration is to find the relationship between the two frames by geometric transformations so that force components output by the force sensor may be transformed into the Frenet frame for calculation of $F^s_t$, and the position A may be related to the sensor point S for the calculation of $r_s$ based on $r_A$. Calculation of $F^s_t$.

Since the two frames are centered at the same location, the purpose of the calibration is to find the transformation matrix that rotates one frame to align the other frame.

More particularly, in an embodiment of the invention shown in FIGS. 4 and 6-11, calibration of the force sensor 40 includes rotation about sensor Z axis ($Z_{ssr}$), X axis ($X_{ssr}$), and Y axis ($Y_{ssr}$) as indicated by step 126, step 128, and step 130, respectively.

More particularly, step 126 includes an initial step of rotating about $Z_{ssr}$ to make $X_{ssr}$ horizontal; step 128 includes the step of rotating about $X_{ssr}$ so that the projection of $Z_{ssr}$ onto plane P 148 is aligned with the tangent vector 152 of the trajectory 106 of the shifter measurement point A; and step 130 finally ensures that $Z_{ssr}$ is aligned with the tangent vector the trajectory of the shifter measurement point A 102.

Initially, a weight is attached to the force sensor. Then an angle δ 162 is calculated, and rotation is applied to the sensor frame by rotating it about the $Z_{ssr}$ axis to make $X_{ssr}$ horizontal.

Figure 7:
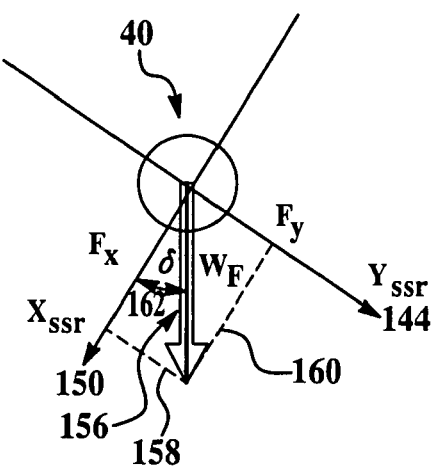
FIG. 7 illustrates a cross-sectional view of the force sensor shown in FIG. 6 before calibration of the X axis.

FIG. 7 illustrates a cross-sectional view of the force sensor 40 shown in FIG. 6 having the $Z_{ssr}$ 146 pointing outwardly before calibration of the $X_{ssr}$ axis 150, wherein an angle δ is formed between the $X_{ssr}$ axis 150 and the direction of gravity ($W_f$).

If the $X_{ssr}$ axis is not horizontal, then the sensor frame is rotated about $Z_{ssr}$ by an angle δ 162 to ensure that $X_{ssr}$ 150 is horizontal. δ may be estimated and then corrected or simply found by incrementally changing it until the x component force as measured by the force sensor becomes zero.

Figure 8:
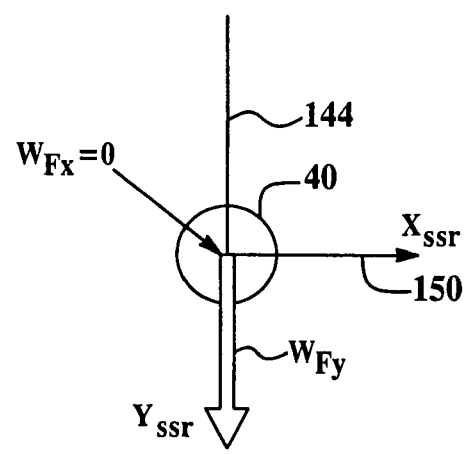
FIG. 8 illustrates a cross-sectional view of the force sensor shown in FIG. 6 after calibration of the X axis.

FIG. 8 illustrates a cross-sectional view of the force sensor 40 having the $X_{ssr}$ axis 144 parallel to a horizontal plane in which case the x component ($F_x$) of the force $W_F$ exerted by the weight is zero, $W_{Fx}=0$. Thus, when $W_{Fx}=0$, the force sensor 40 completes the first step of alignment.

Figure 9:
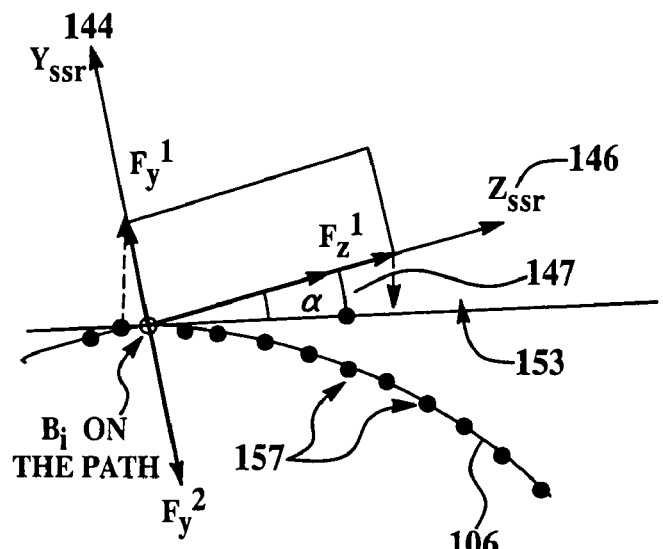
FIG. 9 illustrates an angle formed between a components of a force aligned with the Z axis of the force sensor and a tangent of a shifter trajectory in accordance with an embodiment of the invention.

FIG. 9 illustrates a side view of an upwards first force $F^1$, having first vectors associated with an X, a Y, and a Z component of the first force $F_x^1$, $F_y^1$, and $F_z^1$, respectively; and a downward second force $F^2$ having second vectors associated with an X, a Y, and a Z component of the second force $F_x^2$, $F_y^2$, and $F_z^2$, respectively operating on the shifter 38.

FIG. 9 illustrates an angle α 147 formed between force components measured along the sensor Z axis and the tangent vector of the trajectory 106 of the shifter measurement point A, all projected onto the plane P 148. Rotation of the sensor frame in amount equal to α about $X_{ssr}$ allows projections of $F_z$ onto a plane P 148 to align with the tangent direction of the trajectory 155. A third, which is the last rotation, will rotate the sensor so that the actual force component $F_z$, not its projection onto P 148, will align with the tangent direction of the trajectory 155.

As shown in FIG. 9, to find angle α, an upward first force is first applied to the shifter and then a downward second force is applied to the shifter to activate or move the shifter for the same detent-to-detent travel. Assume a good repeatability of the shifter, the tangential force required to shift it in each of the two actuations for each point on the trajectory of A is the same, i.e., $$F^1_z \cos(\alpha_i) - F^1_y \sin(\alpha_i) = F^2_z \cos(\alpha_i) - F^2_y \sin(\alpha_i) \qquad (2)$$

where i denote a point in the trajectory of A.

Note that $X_{ssr}$ 146 may not be parallel to normal of P 148 to begin with, however, the angle between the P's normal and $X_{ssr}$, i.e., α 161 is typically small if careful hand alignment is performed during equipment setup. Thus, the impact of the misalignment of the plane P 148 and that spanned by the $Y_{ssr}$ and $Z_{ssr}$ is minimum.

From Equation 2, α 147 may be determined, as shown in Equation 3 below, by averaging each $\alpha_i$ at each location and using the result as the angle needed to rotate the sensor frame 151 about $X_{ssr}$ to align $Z_{ssr}$ with the tangent vector of the trajectory, i.e.

$$\alpha = \frac{1}{i_{max}} \sum_{i=0}^{i_{max}-1} \alpha_i \qquad (3)$$

Figure 10:
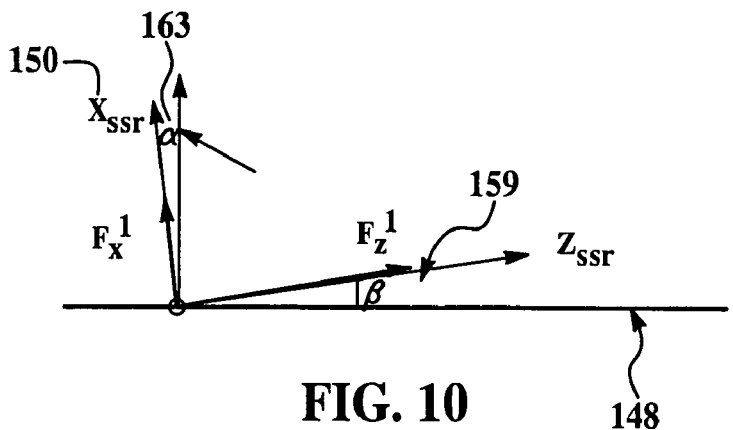
FIG. 10 illustrates a top view of FIG. 9 in accordance with an embodiment of the invention
Figure 11:
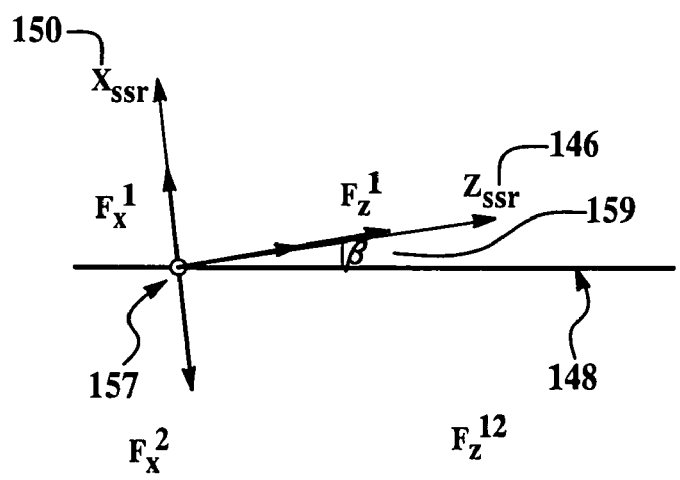
FIG. 11 illustrates another view of FIG. 10 after the X axis has been rotated by the angle α in accordance with an embodiment of the invention.

To explain step 130, refer to FIG. 10, which shows a top view of the representation of FIG. 9. FIG. 10 represents a plane of the estimated shifter trajectory 155 viewed from the top. A value of an angle β formed between the $Z_{ssr}$ axis and a plane P 148 is shown in FIG. 10. As for the reason stated before, β is typically small. Nevertheless, we rotate the sensor frame in step 130 in an amount equal to β about $Y_{ssr}$ to achieve the alignment of the plane spanned by $Y_{ssr}$ and $Z_{ssr}$, and the plane P 148. Similarly a first left force and second right force are applied to activate the shifter. Assuming, that α 147 (5) after step 128, is small and, assume a good repeatability of the shifter, the tangential force required to shift it in each of the two actuations for each point on the trajectory of A is the same, i.e., $$F^1_z \cos(\beta_i) - F^1_x \sin(\beta_i) = F^2_z \cos(\beta_i) - F^2_x \sin(\beta_i) \qquad (4)$$

From Equation 4, the angle β can be determined, as shown in Equation 5 below, by averaging β found at each location and using the result as the angle needed to rotate the sensor frame 151 about $X_{ssr}$, i.e.

$$\beta = \frac{1}{i_{max}} \sum_{i=0}^{i_{max}-1} \beta_i \qquad (5)$$

FIG. 12 represents another embodiment of the invention that operates to calibrate the force sensor using a two step alignment procedure that combines the last two steps of rotation into one single step.

Assume in the Frenet frame (which moves along a sensor trajectory), that the z axis points along a tangent direction of the trajectory, the y axis points along the normal direction of the curve, and the x axis represents the cross product of the Z and the X axis, as shown in FIG. 6.

The sensor trajectory plane is assumed to be vertical. Under this assumption, a weight is tied to the end-effector. The force components $F^s_x$ and $F^s_y$ are measured and the sensor frame is rotated along the sensor z axis $Z_s$ by $\arctan(F^s_x/F^s_y)$ so that the sensor frame Y axis is parallel to the sensor trajectory plane. The adjustment may be performed by using software to rotate the z axis until the x component force of the force sensor readings equals zero or substantially equals zero in a similar manner as shown in FIGS. 7-8. Thus, the z axis $z_s$ is rotated to make the Y axis $Y_s$ parallel to a vertical plane.

Next, the sensor frame is rotated about the frame's $Y_{ssr}$ axis by γ and then around its $X_{ssr}$ axis by θ so that the $Z_{ssr}$ axis is aligned with the tangent direction of the sensor trajectory. With γ and θ, a transformation is established in accordance with Equation 44:

$$\begin{bmatrix} F_x \\ F_y \\ F_z \end{bmatrix} = \begin{bmatrix} \cos\gamma & 0 & \sin\gamma \\ \sin\theta\sin\gamma & \cos\theta & \sin\theta\cos\gamma \\ \cos\theta\sin\gamma & -\sin\theta & \cos\theta\cos\gamma \end{bmatrix} \begin{bmatrix} F^s_x \\ F^s_y \\ F^s_z \end{bmatrix} \qquad (6)$$

where $(F_x, F_y, F_z)$ are component forces in the shifter frame and $(F^s_x, F^s_y, F^s_z)$ the component forces in the sensor frame. Because of the component force relationships, $F_z$ may be equated to $F^s_t$ and used for calculation of the torque (see Equation 1).

In order to determine the two angles: γ and θ, several force equations are used in accordance with values determined along the shifter trajectory's tangent direction. Assuming that the shifter is repeatable, meaning that the net effort needed to shift (i.e., the effort along the tangential direction of the trajectory) remains the same no matter how the shifter is actuated.

The operator shifts the shifter for at least three times, each time applying a different force bias (pull towards left, right, up, or down) to solve for γ and θ in accordance with Equation 7:

$$F_z = F_{xi}^s \cos\theta \sin\gamma - F_{yi}^s \sin\theta + F_{zi}^s \cos\theta \cos\gamma, i=1,2,3 \quad (7)$$

Because each time $F_z$ is the same, Equations (8) (9) follow:

$$(f_{x1}^s - f_{x2}^s)\tan\gamma - (f_{y1}^s - f_{y2}^s)\frac{\tan\theta}{\cos\gamma} + (f_{z1}^s - f_{z2}^s) = 0 \quad (8)$$

$$(f_{x1}^s - f_{x3}^s)\tan\gamma - (f_{y1}^s - f_{y3}^s)\frac{\tan\theta}{\cos\gamma} + (f_{z1}^s - f_{z3}^s) = 0,$$

where $$X = \tan\gamma$$
$$Y = \frac{\tan\theta}{\cos\gamma} \quad (9)$$

Subtitling X and Y for γ and θ in Equations 46-47, respectively, we obtain $$(f_{x1}^s - f_{x2}^s)X - (f_{y1}^s - f_{y2}^s)Y = f_{z2}^s - f_{z1}^s$$

$$(f_{x1}^s - f_{x3}^s)X - (f_{y1}^s - f_{y3}^s)Y = f_{z3}^s - f_{z1}^s \quad (10),(11)$$

Equations 10-11 may be solved for X and Y, from which γ and θ can be found:

$$\gamma = \arctan X$$

$$\theta = \arctan(Y \cos\gamma) \quad (12),(13)$$

To find γ and θ accurately, the force components measured during three actuations need to be significantly different. If they are the same, Equations 10-11 will become singular.

Once the force sensor 40 is calibrated using the three-step or the two-step calibration method, its readings representing forces along its Z axis direction are the forces required to actuate the shifter at center of the force sensor S 304. These forces contribute directly to the force portion of a measured force-travel profile.

Measurement of travel portion of a force-travel profile is explained in the next several sections. FIG. 2 illustrates a view of an end effecter 39 of the system 30. The end effecter 39 provides the connection of the cables $n_1$ 52, $n_2$ 50 and transducers B1 60, B2 62 from the shifter reference pole 54 to the point A 102 further illustrating a detailed of the trajectory of the reference point A forming a circular arc 106. A center of a circle formed by the circular arc 106 is shown as O and represents the shifter shaft center of rotation 100. Each of the cables 52, 50 are capable of extending and retracting in accordance with travel of point A.

Figure 22:
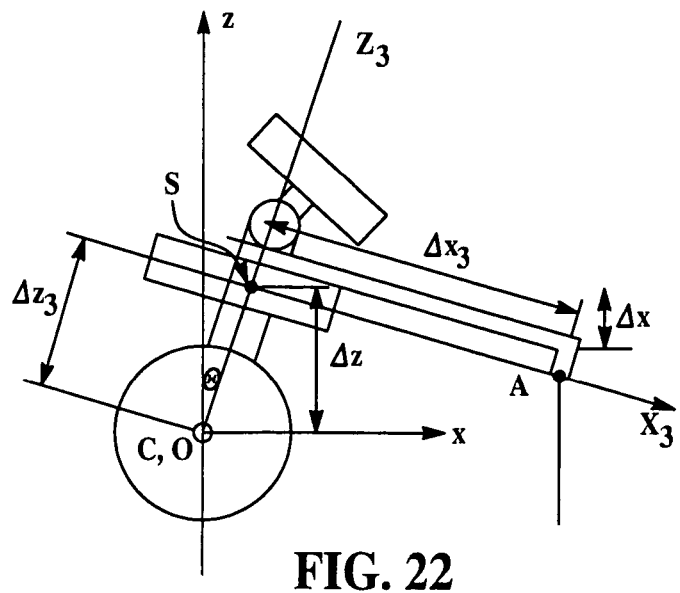
FIG. 22 illustrates a top view of a mounting condition of an end effecter in accordance with one embodiment of the invention.

As shown in FIGS. 2 and 22, the system collects position information at the tip of the position arm at reference point A and force data at center S of the force sensor. However, since the center of the shifter knob C is where effort-travel needs to be determined, the system can convert the data collected from A and S to C based on their geometric relationships.

Referring to FIG. 2, the trajectory of A, and thus, position of A can be calculated using trigonometry that is based on distance readings ($n_1$ 52, $n_2$ 50) from the two position transducers B1 62, B2 60 and the known distance between $s_{12}$ the two transducers 62, 60. FIG. 2 illustrates a reference coordinate system defined for the trajectory calculation.

Determination of the trajectory of point A may be performed by triangulation wherein one of the two extreme positions of the shifter can be used as a reference for the angular position limits of the shifter.

The coordinate system of A, as shown in FIG. 2 is such that a Y axis, $Y_r$, starts from the bottom transducer B2 60 and points upwardly, passing through the top transducer B1 62. An X axis $X_r$ points perpendicularly to the right. The Z axis $Z_r$ may be formed by the right-handed rule, but is not considered in the two-dimensional problem disclosed herein with respect to FIG. 2. The coordinates (0, $S_{12}$) and (0, 0) represent for the two transducer cable exit points. The coordinates of A are defined by ($x_A$, $y_A$), and may be calculated by the following set of Equations 14-16:

$$\phi = \arccos\left(\frac{n_1^2 + s_{12}^2 - n_2^2}{2n_1 s_{12}}\right) \quad (14)$$

$$x_A = -n_1 \sin\phi, \quad (15)$$

$$y_A = -n_1 \cos\phi + s_{12} \quad (16)$$

Using Equations 14-16, a sequence of points may be found for A. A circular arc may be fit through the points to obtain the rotation center of the shifter O 100 and hence the corresponding radius of the trajectory of A.

A cable-driven position transducer measures the change of distance by counting the number of reel rotations when the cable is pulled thereby measuring relative distance but not absolute distance. Therefore, the initial values of $n_1$, $n_2$ together with $s_{12}$ need to be measured by an operator.

The system may include a self-calibration capability for position sensing. The self-calibration method reduces the need for an operator to either measure an initial extension of the cables $n_1$ 52, $n_2$ 50 or the distance S12 between the position transducers B1 62, $B_2$ 60. The self-calibration method uses a statistic approach to determine cable extension and transducer position parameters based on pre-defined estimated value and based on the assumption that the trajectory of A is a circular arc defined within a two dimensional plane.

In operation, $n^0_1$, $n^0_2$ (initial values of $n_1$ 52, $n_2$ 50) and $s_{12}$, are estimated. At any time during a shifting operation, $n_1$, and $n_2$ may be found by in accordance with Equations 17-18:

$$n_1 = n^0_1 + \Delta n_1$$

$$n_2 = n^0_2 + \Delta n_2 \quad (17),(18)$$

wherein ($\Delta n_1, \Delta n_2$) are actual readings from the position transducers B1 62, B2 60. Based on point ($n_1, n_2$) and $s_{12}$, the trajectory of A using Equations 35-56. The result is a set of ordered points, i.e., $\{x_{Ai}, y_{Ai}, i=1, i_{max}\}$. For simplicity herein, the subscript A in the coordinates and radius of the trajectory of A and in the rest of this section are no longer shown.

Figure 13:
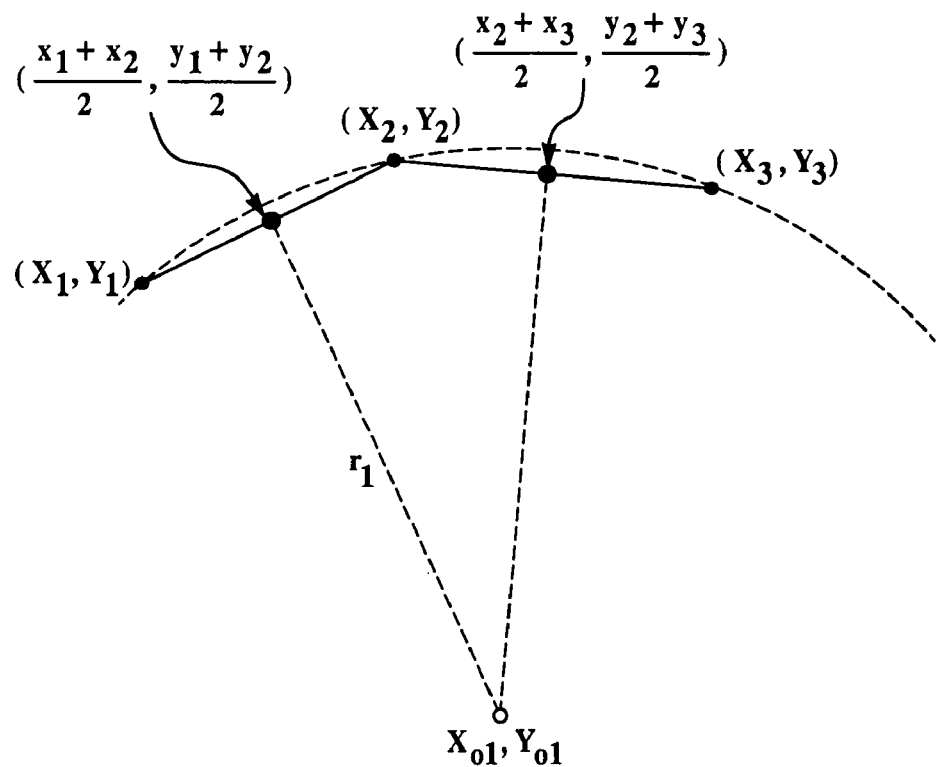
FIG. 13 illustrates the determination of a rotation center of the shifter by calculating a trajectory of a measured point A based on a position estimate of the measured reference point A.

FIG. 13 illustrates three points being used to fit a circle to determine the resulting radius and center of the circle.

Every three points determined as $\{x_i, y_i, i=1, i_{max}\}$ with a fixed index increment are used to define a circle that passes through each of the three points, shown in FIG. 13 as ($X_1, Y_1$), ($X_2, Y_2$), and ($X_3, Y_3$).

As illustrated in FIG. 13, the center of an arc $X_{c1}, Y_{c1}$ may be found by intersecting two lines 340, 342 each of them passing through the center of and perpendicular to one of the two adjacent line segments 336, 338 defined by the three points.

An average center of the circle for the entire trajectory may be found in accordance with Equations 19-20:

$$x_o = \frac{\sum_{i=1}^{(i_{max}-1)/3} x_{oi}}{(i_{max}-1)/3}, \quad (19)$$

$$y_o = \frac{\sum_{i=1}^{(i_{max}-1)/3} y_{oi}}{(i_{max}-1)/3} \quad (20)$$

wherein $(i_{max}-1)/3$ is rounded down to the next closest integer if it is not a multiple of 3. With the average center of the circle, i.e., $(x_0, y_0)$, calculated, the radius of the arc r approximating the radius of entire point set may be calculated in accordance with Equation 21.

$$r = \frac{\sum_{i=1}^{(i_{max}-1)/3} \sqrt{(x_i - x_o)^2 + (y_i - y_o)^2}}{(i_{max}-1)/3} \quad (21)$$

The angular position of each point in the point set may be calculated by $$\alpha_i = \arctan\frac{y_i - y_o}{x_i - x_o} \quad (22)$$

If $(\Delta n_1, \Delta n_2)$ and $s_{12}$ are accurate, then the resulting point set represents a true circular path. If $(\Delta n_1, \Delta n_2)$ and $s_{12}$ are not accurate then the result will deviate from a true arc. Self-calibration is performed to correct $s_{12}$, $n^o_1$ and $n^o_2$ by identifying which set of these three values would produce a best approximation to a true circular arc.

Figure 14:
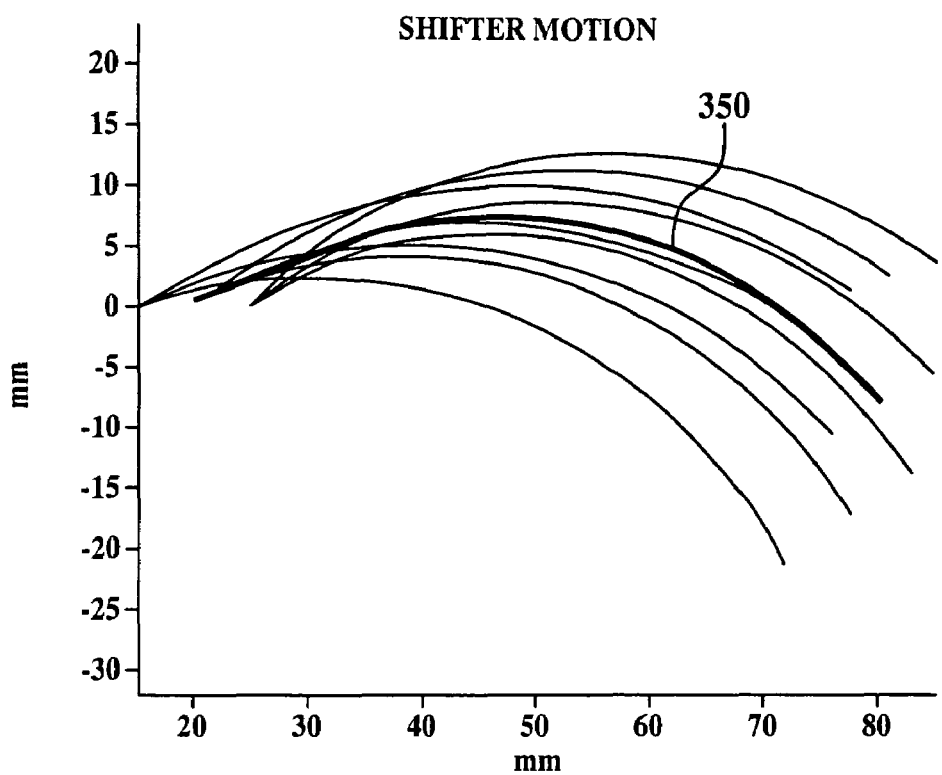
FIG. 14 illustrates a graph representing shifter motion measured in accordance with an embodiment of the invention.
Figure 15:
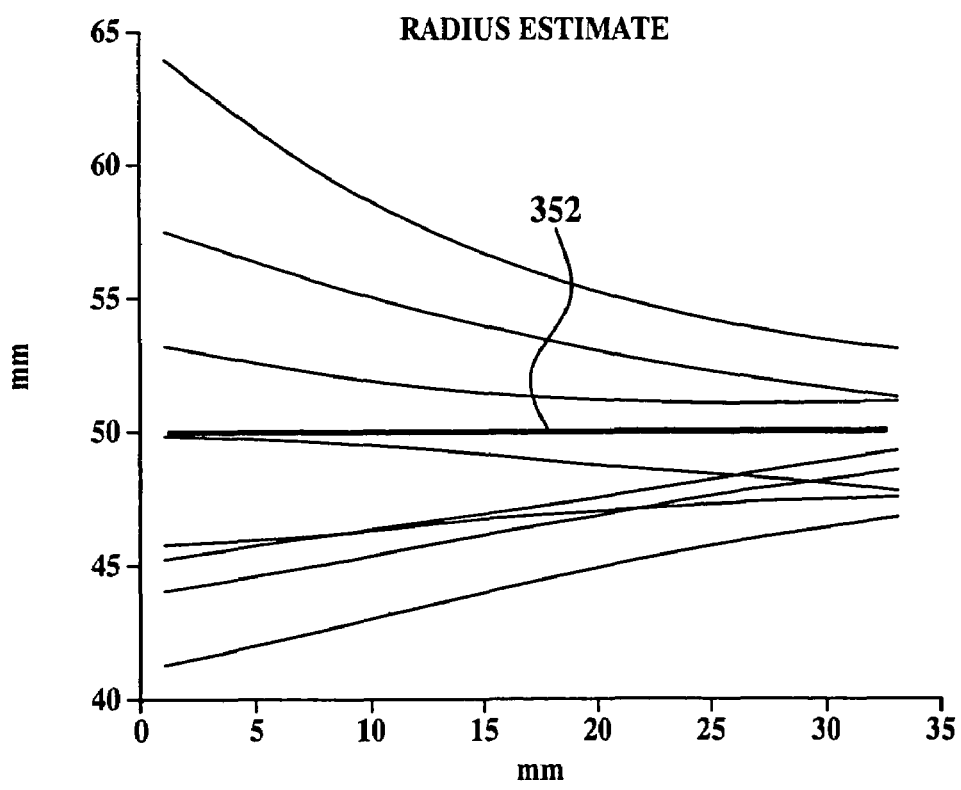
FIG. 15 illustrates a graph representing a radius estimate calculated in accordance with an embodiment of the invention.

FIG. 14 shows a family of trajectories corresponding to a series of variations of $s_{12}$, $n^o_1$ and $n^o_2$ close to their initial input values. The bold curve 350 indicates a best match to a circular arc. FIG. 15, similarly, plots the estimated radius for each of the three consecutive points, corresponding to the same series of variations of $s_{12}$, $n^o_1$ and $n^o_2$. A constant r value represented by a bold horizontal line 352 is attributed to the best set of $s_{12}$, $n^o_1$ and $n^o_2$ values.

The true initial value of $s_{12}$, $n^o_1$ and $n^o_2$ may be determined by minimizing a variance of r, i.e., by solving Equation 23:

$$\min_{n^o_1, n^o_2, s_{12}} \delta_r \quad (23)$$

wherein $\delta_r$ is the standard deviation of $\{r_i\}$ from r, which is calculated by Equation 21. There are several embodiments provided to solve Equation 23.

One embodiment of the invention provides an exhaustive search in which $s_{12}$, $n^o_1$ and $n^o_2$ are continuously varied by small increments until a solution is found.

Finding the trajectory of A by solving a two-dimension problem is valid under the assumption that the plane spanned by cables $n_1$ 52, $n_2$ 50 and the pole 54 is the same as the plane P 138 where the shifter shaft motion is confined. If the shifter pole 54 is not precisely aligned to the plane P 148, then an error in the measurement will result. The misalignment situation is illustrated in FIG. 16. FIG. 16 illustrates a shifter knob cross section on the plane P 148 where the motion of the shifter 38 is defined. The actual reference of the location pole 54 is defined as 200, and the ideal location of the reference poll as defined as 208.

One solution to the misalignment problem is to add a third position transducer to make the position-sensing of point A a three-dimensional operation. The position of point A may be determined in accordance with the following three equations, Equations 24-26, respectively.

$$(x-x_{n_1})^2+(y-y_{n_1})^2+(z-z_{n_1})^2=n_1^2 \quad (24)$$

$$(x-x_{n_2})^2+(y-y_{n_2})^2+(z-z_{n_2})^2=n_2^2 \quad (25)$$

$$(x-x_j)^2+(y-y_j)^2+(z-z_j)^2=j^2 \quad (26)$$

Each of the Equations 24-26 may be simplified into the following linear system of equations, Equations 27-29.

$$(x_{n_2}-x_{n_1})x+(y_{n_2}-y_{n_1})y+(z_{n_2}-z_{n_1})z=0.5(n_1^2-n_2^2+x_{n_2}^2-x_{n_1}^2=y_{n_2}^2-y_{n_1}^2=z_{n_2}^2-z_{n_1}^2)$$

$$(x_j-x_{n_1})x+(y_j-y_{n_1})y+(z_j-z_{n_1})z=0.5(n_1^2-j^2+x_j^2-x_{n_1}^2+y_j^2-y_{n_1}^2+z_j^2-z_{n_1}^2)$$

$$(x_j-x_{n_2})x+(y_j-y_{n_2})y+(z_j-z_{n_2})z0.5(n_2^2-j^2+x_j^2-x_{n_2}^2+y_j^2-y_{n_2}^2+z_j^2-z_{n_2}^2) \quad (27),(28),(29)$$

Finally we need to determine the trajectory of S, which may be determined based on the trajectory of A, and using the calculated values of γ and θ.

Figure 20:
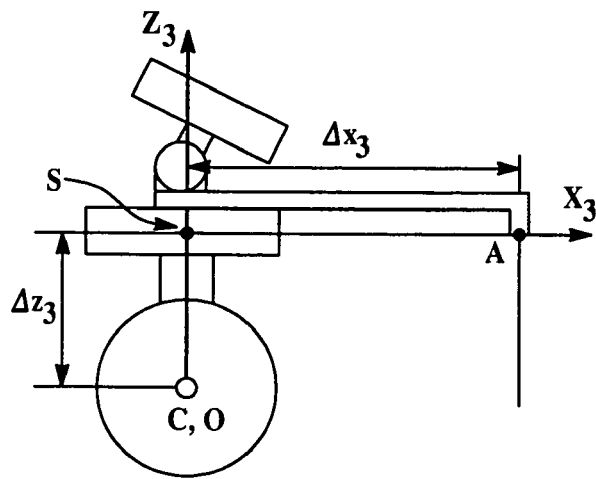
FIG. 20 illustrates a top view of a mounting of an end-effector onto a shifter in accordance with one embodiment of the invention.
Figure 21:
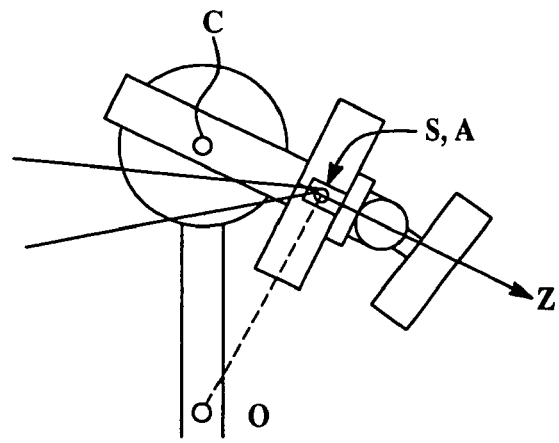
FIG. 21 illustrates a side view of a mounting of an end-effector onto a shifter in accordance with one embodiment of the invention.
Figure 23:
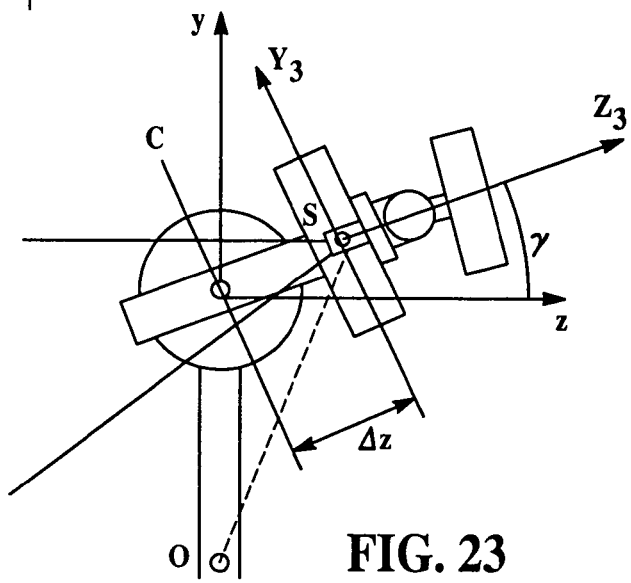
FIG. 23 illustrates a side view of a mounting condition of an end effecter in accordance with one embodiment of the invention.

FIGS. 20-21 illustrate a preferred mounting of the end-effector onto a shifter in accordance with one embodiment of the invention. Preferably, the end-effector is mounted in a way that the force sensor's Z axis is aligned with the tangent vector of the trajectory of S. FIGS. 22-23 illustrate a mounting condition where the force sensor is mounted on an arm $\Delta z_s$ forward, and point A is $\Delta y_s$ sideways, from the shifter point C. As shown in FIGS. 20-21, the trajectory radius at S is the same as at A.

The device may be mounted differently, such that $Z_{ssr}$ is not aligned with the tangent direction but is related to the tangent direction in accordance with the following transformation matrix:

$$\begin{bmatrix} \cos\gamma & 0 & \sin\gamma \\ \sin\theta\sin\gamma & \cos\theta & \sin\theta\cos\gamma \\ \cos\theta\sin\gamma & -\sin\theta & \cos\theta\cos\gamma \end{bmatrix} \quad (30)$$

FIGS. 22-23 illustrate a mounting condition of an end effecter in accordance with one embodiment of the invention. The component of $\Delta z_s$ on the motion plane shown in FIGS. 22-23 is $\Delta z=\Delta z_s \cos(\theta)$, wherein θ is the angle formed by the motion plan and the plane spanned by $z_s$ and $y_s$ of the sensor frame, which may be measured. The lateral displacement also has a similar correction factor: $\Delta x=\Delta x_s \sin(\theta)$.

The following Equations 31-32 calculate the radius at the force sensor first, and then at the shifter, starting from a position transducer connection Δx is taken as a signed translation: positive fore, negative aft.

$$r_s^2=r_a^2+\Delta x^2-2\Delta x \, r_a \sin(\gamma) \quad (31)$$

$$r_c=\sqrt{r_s^2+\Delta z^2-2\Delta z r_s \sin(\gamma)} \quad (32)$$

The torque may be calculated using the $r_s$ value and Equation 1.

Figure 24:
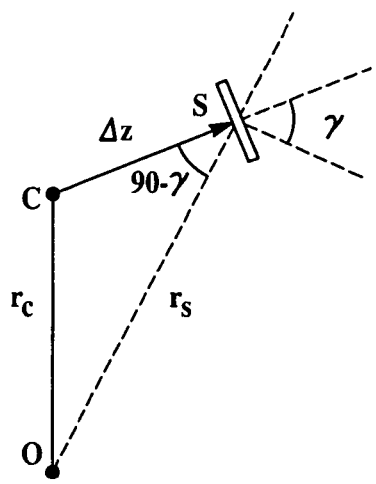
FIG. 24 illustrates a relationship between radius of S and a center C in accordance with one embodiment of the invention.
Figure 25:
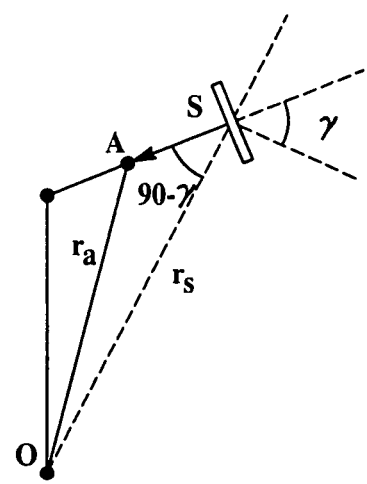
FIG. 25 illustrates a relationship between a radius of S and a reference point A in accordance with one embodiment of the invention.

FIGS. 24-25 generally illustrate a relationship between the radius of trajectory of S and that of C and between the radius of trajectory of S and that of A. FIGS. 24-25 further illustrate relation of the radius at the force sensor S to that of the shifter point O, and the radius at the force sensor S with that at the position transducer attachment point A.

Figure 27:
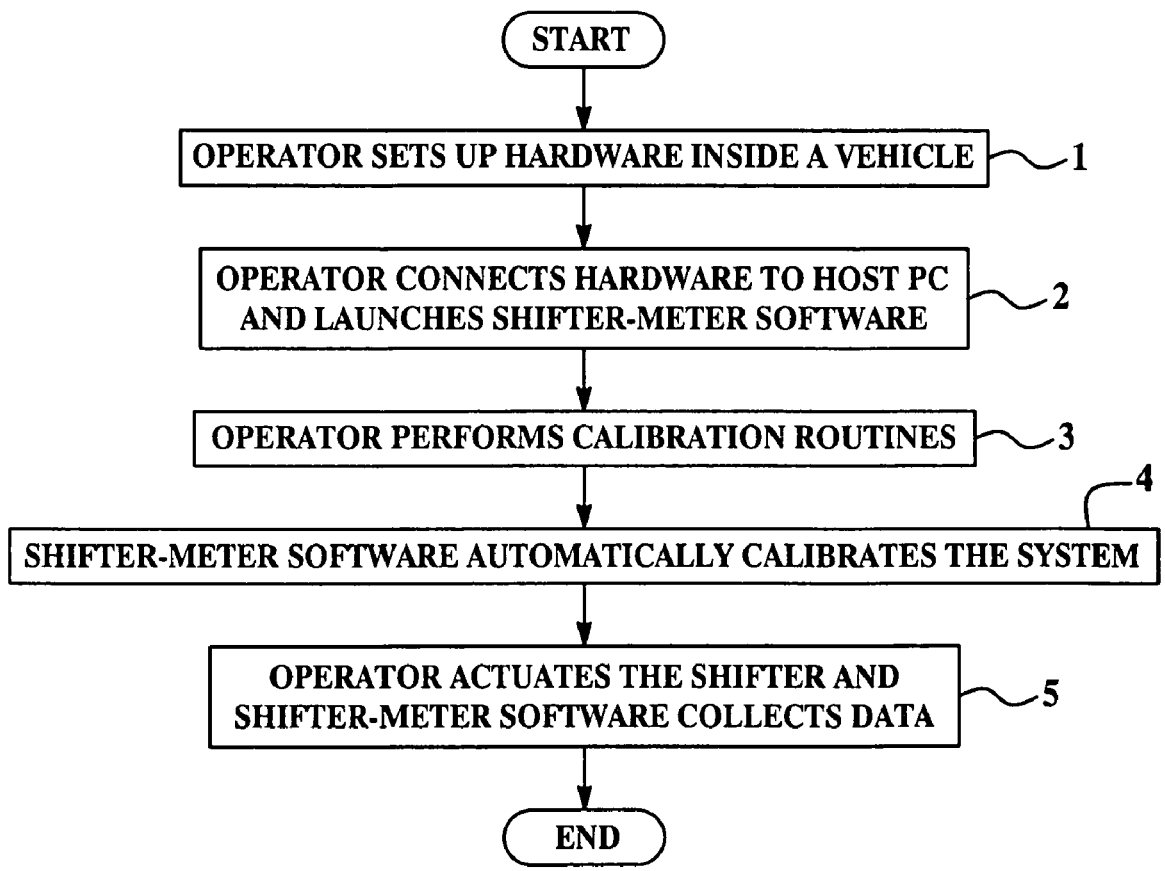
FIG. 27 illustrates a measurement process in accordance with one embodiment of the invention.

A measurement process is provided in accordance with one embodiment of the invention as shown in FIG. 27. The process (400) provides the following steps:

Operator sets up hardware inside a vehicle (402);

Operator connects position transducer cables to the end-effector, connects hardware to the host PC and launches the Shifter-Meter Software (404);

Operator performs calibration routines (406);

Shifter-Meter software automatically calibrates the system (408); and

Operator actuates the shifter and shifter-Meter Software collects data (410).

Setting up hardware inside a vehicle (402) includes:

Mounting the end-effector onto the shifter knob (414);

Fixturing the position reference pole and the position transducers (416); and

Making necessary adjustments so that moving parts are all free to move within their intended operation ranges (418).

Connecting position transducer cables to the end-effector, and hardware to the host PC and launching the Shifter-Meter software includes the following process after launching the software:

connecting the cables of position transducers to the end-effector (420); and entering the data ($n_1$, $n_2$) and $s_{12}$ into the system, wherein ($n_1$, $n_2$) may either be actual measured values or estimated values (422).

The Operator performs calibration routines (406) by shifting the shifter a minimum of a predefined number of times, preferably three times. Each time the operator applies a different force (pull towards left, right, etc.) for the purpose of making sure that the sensor readings are different enough so that equation system $S_{12}$ 50, 51 are solvable.

For the calibration purpose, the operator may complete only one detent of the entire travel path of the shifter. For instance, detent from Neutral to Drive may suffice in this step.

The step of using the Shifter-Meter software to calibrate the system (408) includes: Self-calibrating of position transducers (424) and calibrating of force sensors using the methodologies discussed.

The step of actuating the shifter and Shifter-Meter software to collect and output data (410) includes having the operator shift the shifter through the shifters entire operating path, the system computes the force-travel data and displays results.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A system that determines a force-travel profile of a shifter in a vehicle having an instrument panel counsel, a windshield, and a shifter having an associated shifter shaft for a transmission, the system comprising:

a shifter fixture mounted to the shifter;

a hand actuation interface that operates to actuate the shifter when force is applied to the hand actuation interface by a user;

a multi-dimensional force sensor (force sensor) that operates to sense forces sustained on the shifter fixture mounted to the shifter;

a rigid linkage that interconnects the shifter fixture with the force sensor;

a universal joint connecting two rigid linkages, one connecting the hand actuation interface and the other connecting the force sensor;

a travel measurement rod for mounting position transducers;

at least two transducers, a first transducer and a second transducer each mechanically mounted onto the travel measurement rod to determine position of a reference point associated with the travel measurement rod; and a data acquisition device in operable electrical communication with the multi-dimensional force sensor and the at least two transponders, wherein the data acquisition device operates to process force inputs received from the multi-dimensional force sensor and reference point position inputs from the at least two transponders to generate a force-travel curve of the shifter.

2. The system of claim 1, further comprising:

an end of the rod defines a measured reference point A from where relative travel of the shifter is measured;

a first cable associated with the first transducer having a first end connected with the first transducer and a second end connected to the reference point A;

a second cable associated with the second transducer having a first end connected with the second transducer and a second end connected to the reference point A, wherein each of the cables are capable of extending and retracting in accordance with travel of reference point A.

3. The system of claim 2, further comprising:

a third transducer; and a third cable associated with the third transducer having a first end connected with the third transducer and a second end connected to the reference point A, wherein the third cable is capable of extending and retracting in accordance with travel of reference point A.

4. The system of claim 1, wherein the position transducers measure the position of the reference point A along an arc, wherein the arc defines a trajectory of the measured point A when the hand actuation interface is actuated by a user.

5. The system of claim 1, further comprising:

a transducer reference pole, wherein the first and second transducers mount on the transducer reference pole, and wherein the first and second transducers are spaced apart a predefined distance along the transducer reference pole.

6. The system of claim 1, wherein the data acquisition device comprises:

a processor;

an input/output device; and a monitor in operative electrical communication with the processor and with the input/output device, the monitor having a graphical user interface for displaying processed force and position data associated with the sensor.

7. The system of claim 6, wherein the processed shifter force data and shifter position data is plotted as a force-travel curve on a force-travel graph having the processed shifter force data representing forces applied to the shifter along a first axis, and processed shifter position data representing travel of the shifter along a second axis of the force-travel graph.

8. The system of claim 1, further comprising:
a sensor data-conditioning unit in electrical communication with the force sensor and the data acquisition device via communication link.

9. The system of claim 1, further comprising:
a shifter fixture reference point defining a shifter reference point on the shifter fixture from where forces applied to the shifter are measured by the force sensor.

10. A method of determining a force-travel profile of a shifter in a vehicle having an associated shifter shaft for a transmission, the method comprising the steps of:
associating forces applied to a shifter with movement of the shifter;
determining a shifter trajectory, wherein the shifter trajectory represents a path of movement of the shifter when forces are applied to operate the shifter; and
correlating the forces applied to the shifter with each position of the shifter along the shifter trajectory and associated movement of the shifter to calibrate an associated feel of the shifter.

11. The method of claim 10, further comprising the step of:
generating a force versus travel graph that associates forces applied to the shifter with corresponding positions of the shifter along the shifter trajectory.

12. The method of claim 10, further comprising the steps of:
using a multi-dimensional force sensor to measure forces applied to the shifter; and
using at least two transducers to determine the shifter trajectory when forces are applied to the shifter.

13. The method of claim 12, further comprising the steps of:
associating a three-dimensional sensor frame with the sensor having a respective X, Y, and Z component;
associating a three-dimensional shifter frame with the shifter having a respective X, Y, and Z component;
aligning the sensor frame with the shifter frame to accurately measure forces attributed to the operating effort needed for the shifter when the shifter travels along the shifter trajectory; and
aligning the shifter pole of the transducers with the operating plane of motion of the shifter shafter to accurately measure position of a point on the shifter along a trajectory relative to the at least two transducers.

14. The method of claim 13, further comprising the step of:
calibrating the multi-dimensional force sensor to align the force sensor frame with the shifter frame to accurately measure forces attributed to the operating effort needed for the shifter when the shifter travels along the shifter trajectory.

15. The method of claim 13, further comprising the step of:
calibrating the force sensor manually to align the force sensor frame with the shifter frame.

16. The method of claim 13, further comprising the step of:
calibrating the force sensor automatically to align the force sensor frame with the shifter frame.

17. The method of claim 13, further comprising the step of:
measuring a relative position of the shifter with respect to the two transducers.

18. The method of claim 10, further comprising:
representing a force-travel profile of travel-effort data as a function of torque needed to shift vs. an angular displacement of the shifter shaft about its center of rotation.

19. A method of determining a force-travel profile of a shifter in a vehicle having a shifter having an associated shifter shaft for a transmission, the method comprising the steps of:
associating forces applied to a shifter with movement of the shifter;
defining a reference point associated with the shifter;
determining a shifter trajectory, wherein the shifter trajectory represents a path of movement of the reference point associated with the shifter when force is applied to the shifter; and
correlating the forces applied to the shifter with each position of the reference point associated with the shifter along the shifter trajectory.

20. The method of claim 19, further comprising the steps of:
estimate a shifter arc radius associated with the determined shifter trajectory;
estimate the initial position transducer readings and the distance between the two transducers mounted on the travel measurement role;
automatically calculate the actual values of the initial position transducer readings and the distance between the two transducers mounted on the travel measurement role by solving an optimization problem; and
calculate an error factor associated with the shifter trajectory to compensate for known systems errors.

21. The method of claim 19, further comprising the steps of:
integrating the effort data measured by the force sensor and the travel data measured by the at least two position transducers to create a force-travel profile.

* * * * *